Figure 1:
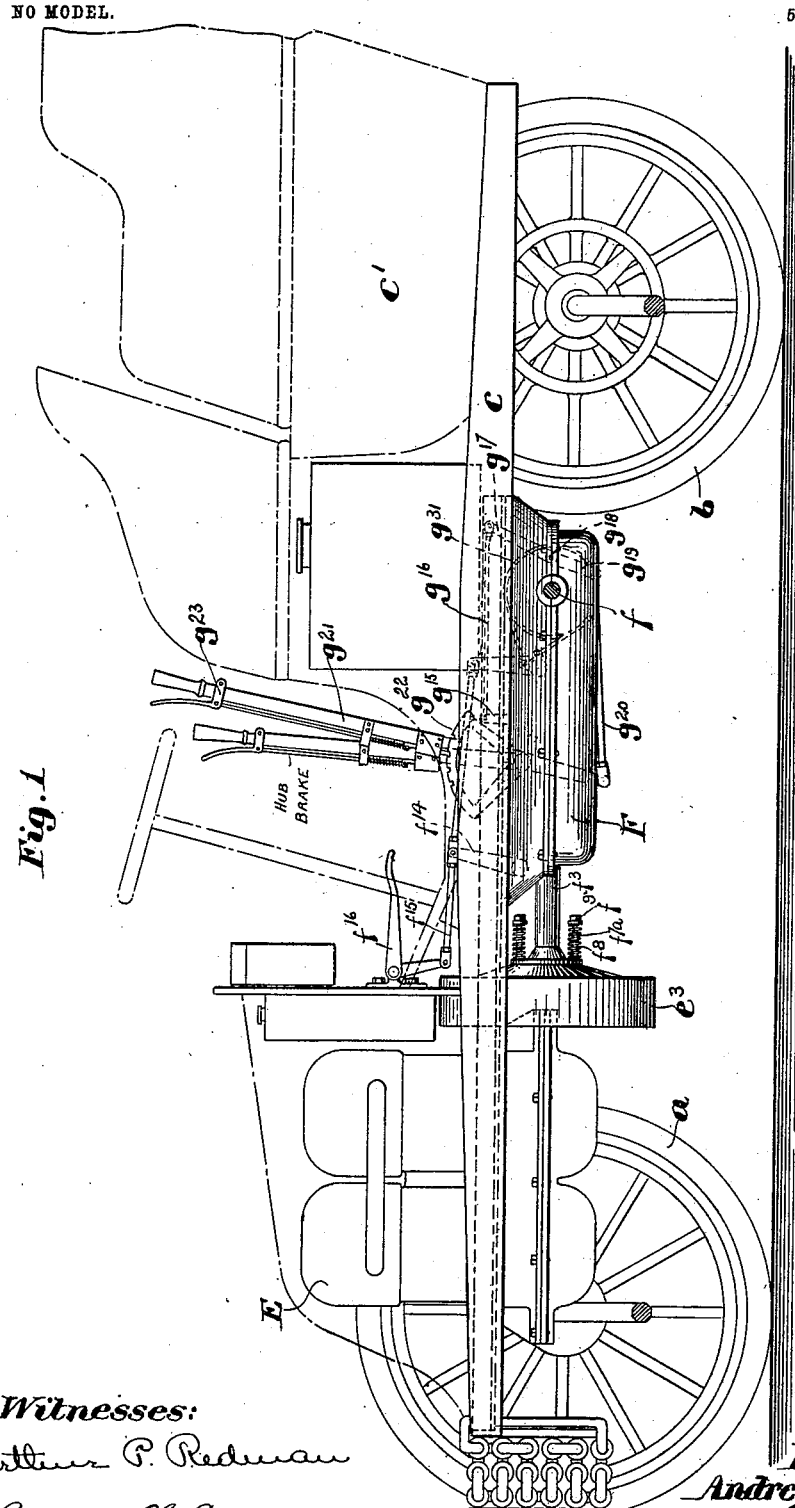

No. 725,629. PATENTED APR. 14, 1903.
A. L. RIKER.
TRANSMISSION GEAR FOR MOTOR VEHICLES.
APPLICATION FILED JULY 16, 1902.
NO MODEL. 5 SHEETS—SHEET 1.

Witnesses:
Inventor:
Andrew L. Riker,
by

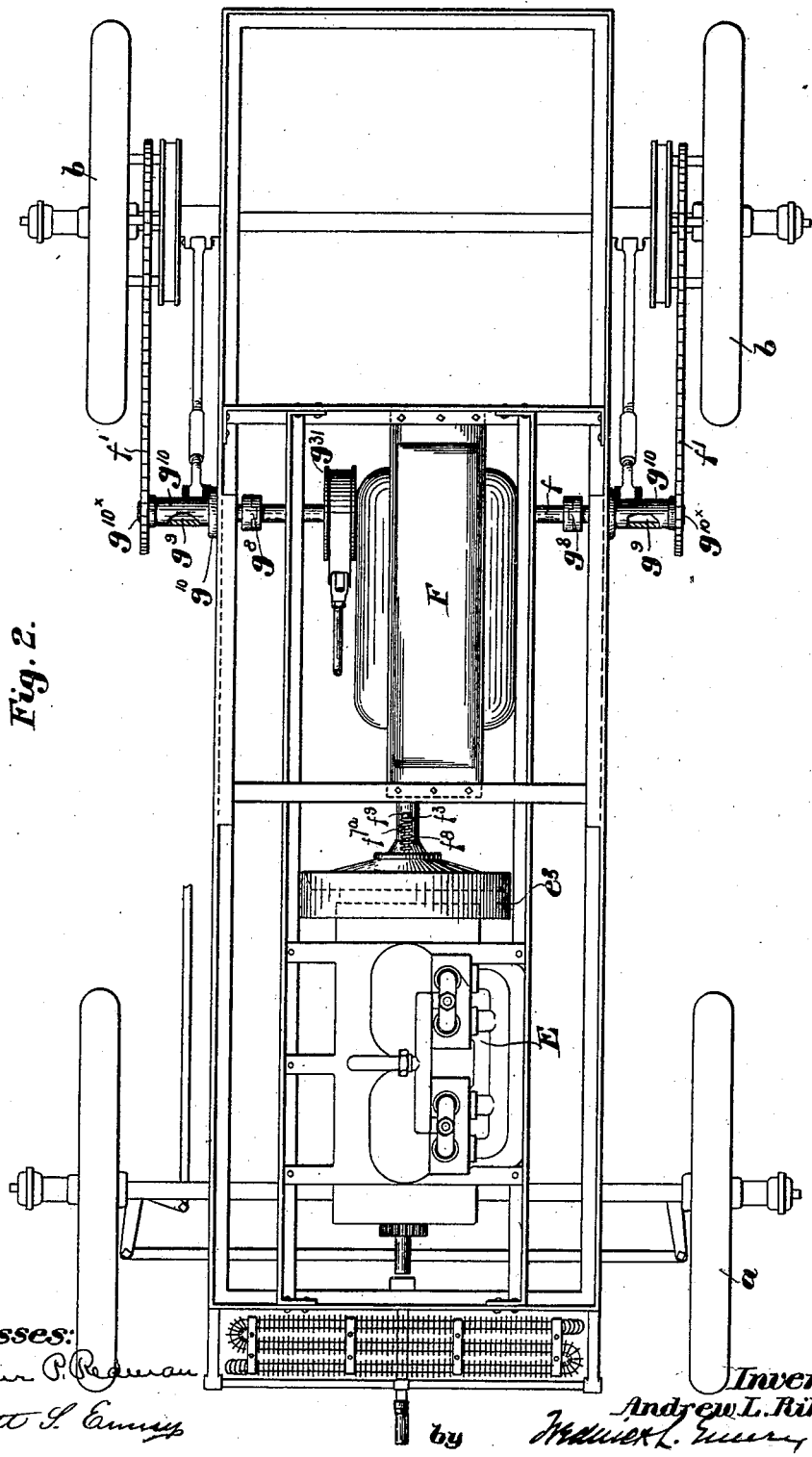

No. 725,629. PATENTED APR. 14, 1903.
A. L. RIKER.
TRANSMISSION GEAR FOR MOTOR VEHICLES.
APPLICATION FILED JULY 16, 1902.
NO MODEL. 5 SHEETS—SHEET 3.
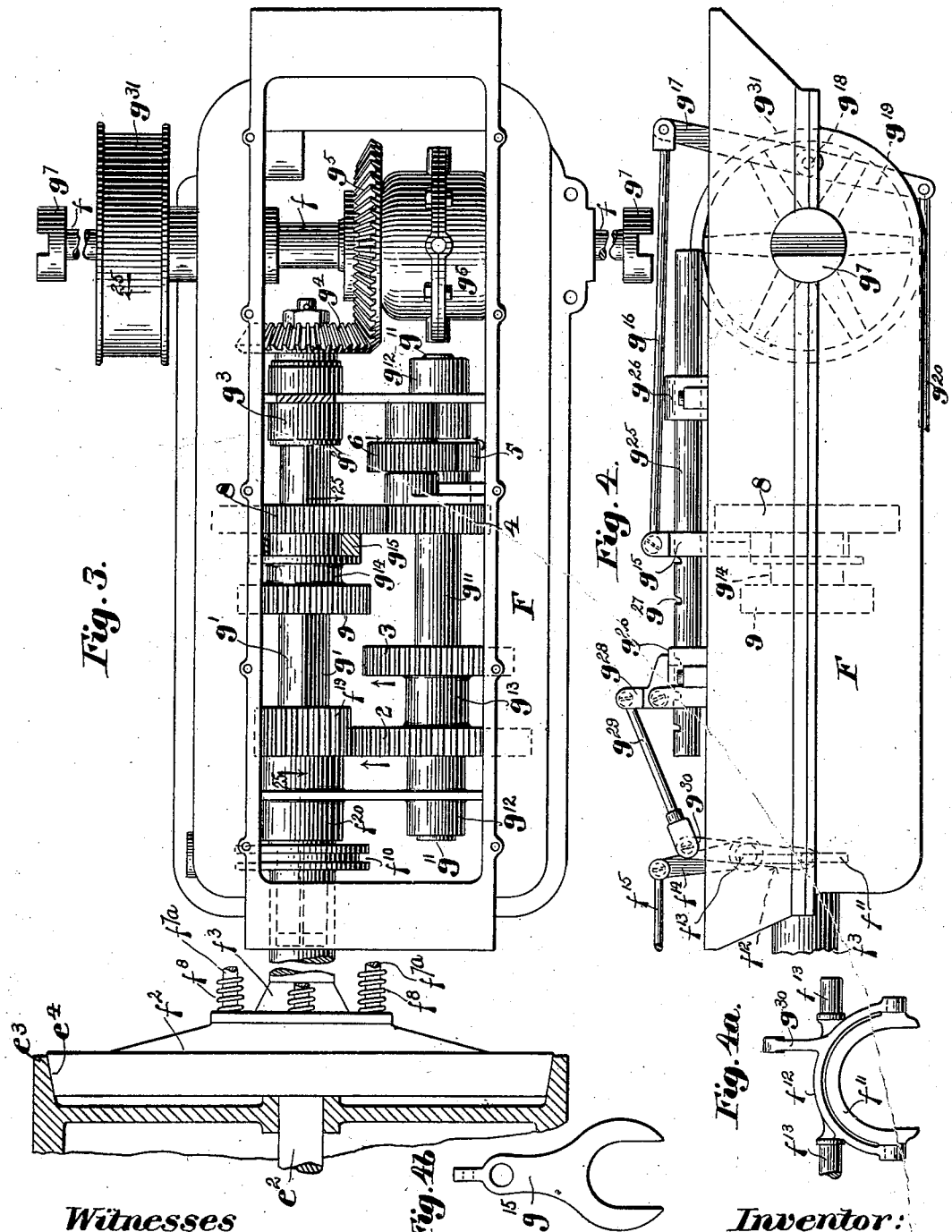
Witnesses
Inventor:
Andrew L. Riker,
by
Atty.

No. 725,629. PATENTED APR. 14, 1903.
A. L. RIKER.
TRANSMISSION GEAR FOR MOTOR VEHICLES.
APPLICATION FILED JULY 16, 1902.
NO MODEL. 5 SHEETS—SHEET 4.
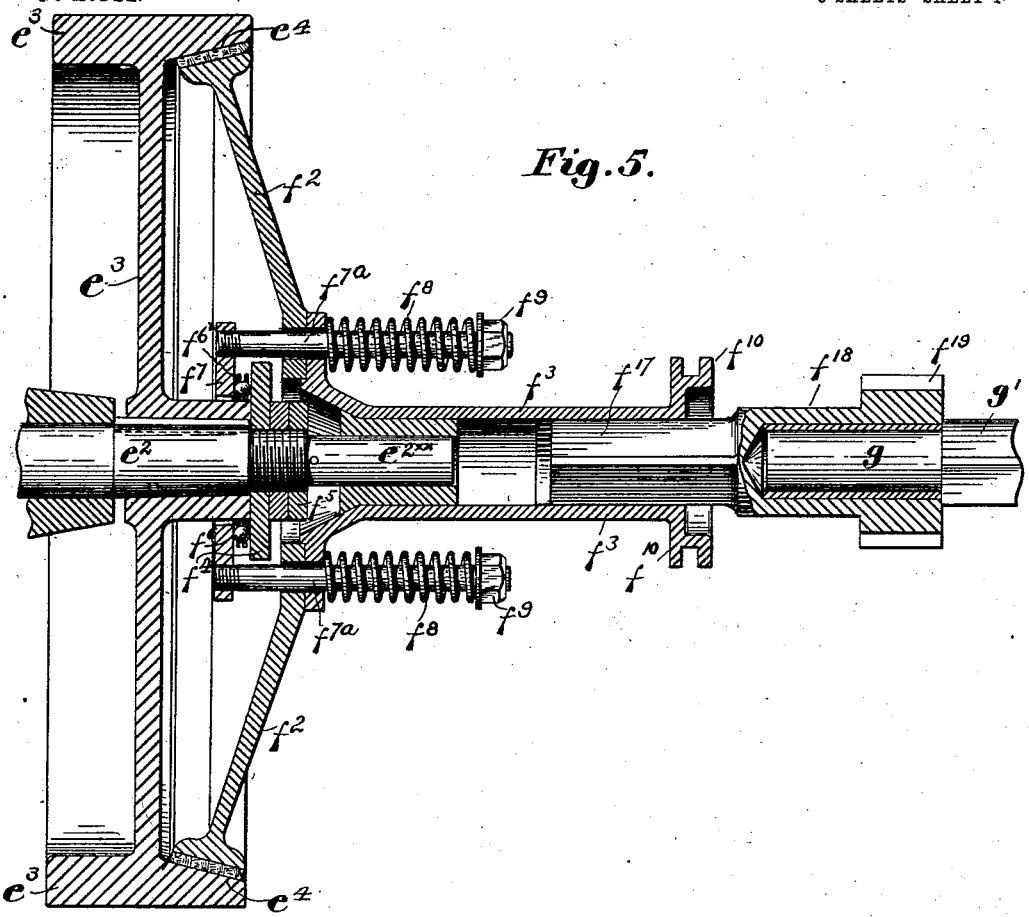
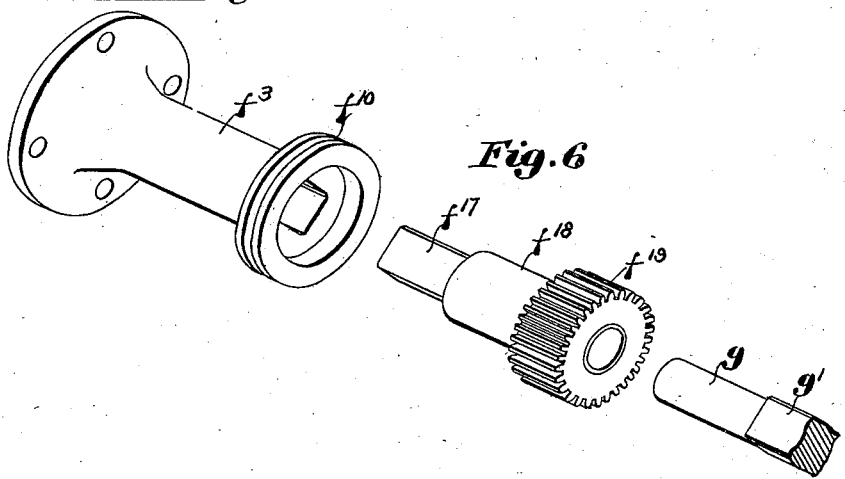
Witnesses:
Arthur P. Redman
Everett S. Emery
Inventor:
Andrew L. Riker,
by Francis L. Emery
Atty.

No. 725,629. PATENTED APR. 14, 1903.
A. L. RIKER.
TRANSMISSION GEAR FOR MOTOR VEHICLES.
APPLICATION FILED JULY 16, 1902.
NO MODEL. 5 SHEETS—SHEET 5.
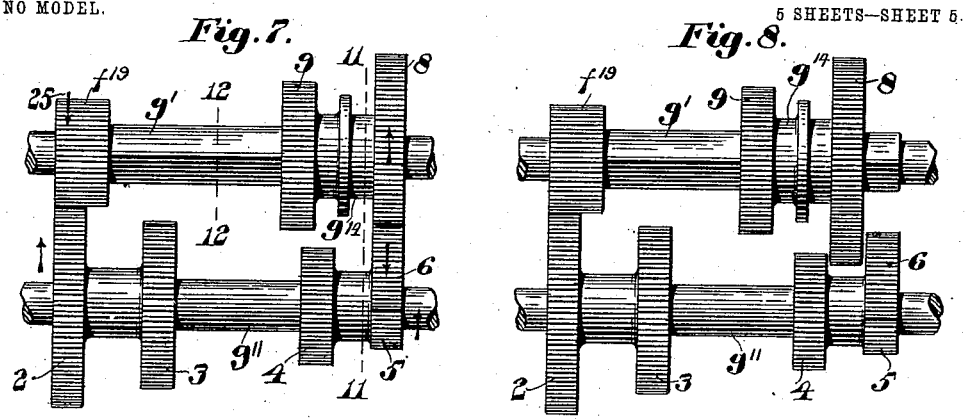
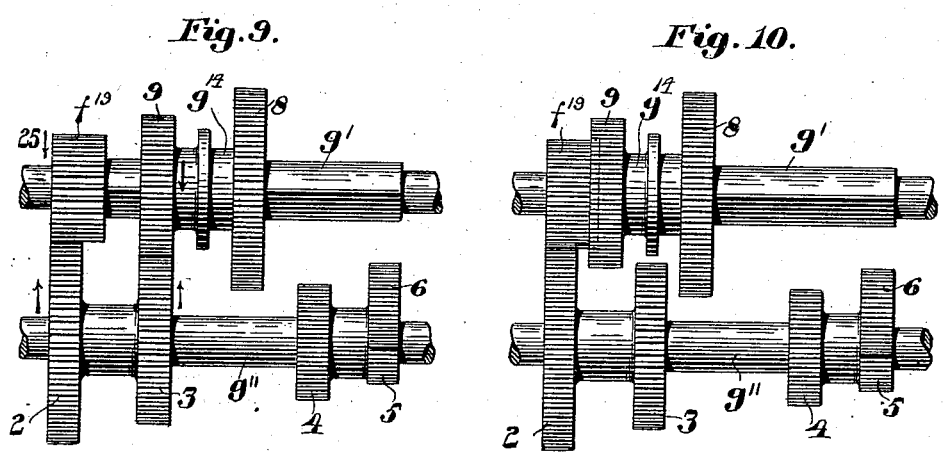
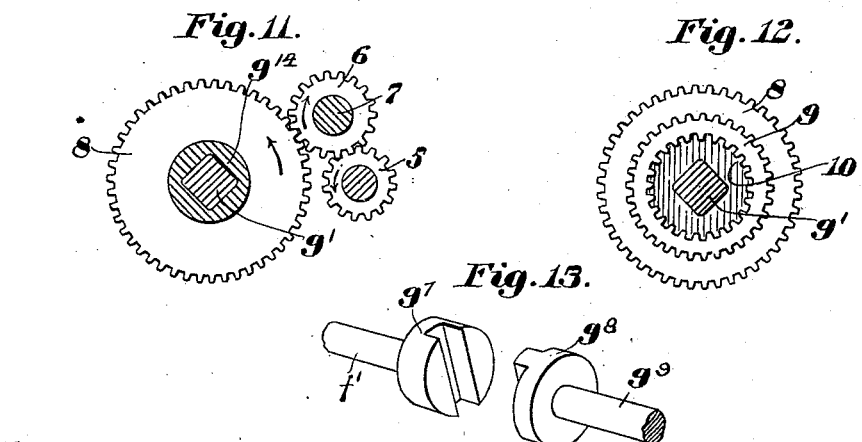
Witnesses:
Arthur P. Redman
Everett S. Emery
Inventor:
Andrew L. Riker,
by Frederick L. Emery
Atty.

UNITED STATES PATENT OFFICE.

ANDREW L. RIKER, OF SHORTHILLS, NEW JERSEY, ASSIGNOR TO THE "LOCOMOBILE" COMPANY OF AMERICA, OF NEW YORK, N. Y., A CORPORATION OF WEST VIRGINIA.

TRANSMISSION-GEAR FOR MOTOR-VEHICLES.

SPECIFICATION forming part of Letters Patent No. 725,629, dated April 14, 1903.

Application filed July 16, 1902. Serial No. 115,842. (No model.)

*To all whom it may concern:*

Be it known that I, ANDREW L. RIKER, a citizen of the United States, residing at Shorthills, in the county of Essex and State of New Jersey, have invented an Improvement in Transmission-Gear for Motor-Vehicles, of which the following description, in connection with the accompanying drawings, is a specification, like characters on the drawings representing like parts.

This invention in motor-vehicles relates particularly to the transmission mechanism, usually called "transmission-gear," interposed between the engine, usually an internal-combustion engine, and the driving shaft or wheels.

The object of my invention is to simplify and improve the construction and operation of the transmission mechanism or gear.

My invention will be best understood from a detailed description of one embodiment thereof shown in the accompanying drawings, wherein—

Figure 1 is a side elevation, partially in dotted lines, illustrating a motor-vehicle equipped with devices made in accordance with my invention. Fig. 2 is a top or plan view of the vehicle Fig. 1 with the body removed. Fig. 3 is a top or plan view looking down upon the gear-box, showing the relative positions of the various gears or parts comprising the transmission mechanism; Fig. 4, a side elevation of the parts shown in Fig. 3; Fig. $4^a$, a detail showing the yoke for shifting the clutch; Fig. $4^b$, a detail showing the yoke for shifting the transmission-gear; Fig. 5, an enlarged sectional detail through the fly-wheel and clutch portions of the mechanism; Fig. 6, a perspective view illustrating the construction of the multipart main shaft of the transmission mechanism or gear; Figs. 7, 8, 9, and 10, details illustrating the various positions of the gears; Fig. 11, a cross-sectional detail on the dotted line 11 11, Fig. 7, showing the relative positions of the gears for imparting reverse movement to the driving-wheels and vehicle; Fig. 12, a cross-sectional detail on the dotted line 12 12, Fig. 7, showing the internal teeth of one of the gears for imparting direct or "one-to-one" forward motion to the driving mechanism; and Fig. 13, a perspective detail illustrating the construction of the jack-shaft.

In the foregoing drawings the principal parts relating to my invention are shaded to bring them out more strongly as compared with the parts more remotely associated therewith.

In the particular embodiment of my invention selected for illustration herein and shown in the drawings, referring first to Figs. 1 and 2, the steering-wheels $a$ and driving-wheels $b$, carrying the spring-supported body-frame $c$, with its body $c'$ and the engine E mounted upon said frame, are and may be of any suitable or desired type or construction, so far as concerns my present invention, which relates mainly to the transmission mechanism principally located at F, and which I will now describe in detail.

Referring particularly to Figs. 2 to 5, inclusive, the crank-shaft of the engine (here marked $e^2$) has fast upon it the fly-wheel $e^3$, (see Fig. 5,) which is formed at one of its faces to furnish a conical friction-surface $e^4$, with which coöperates the movable friction-surfaced clutch member or disk $f^2$. The movable clutch member $f^2$ is shown as mounted upon one end of a sliding sleeve $f^3$, having a bearing at one of its ends upon the reduced end portion $e^{2\times\times}$ of the engine crank-shaft $e^2$. Threaded upon the engine crank-shaft $e^2$ (see Fig. 5) is the end-thrust bearing-plate $f^4$, secured in position by lock-nuts $f^5$, clamping the same firmly against the shoulder upon the shaft and also against the end of the wheel-hub. The bearing-plate $f^4$ at its inner face serves as a bearing for the balls $f^6$, which constitute the end-thrust bearing between said plate and the opposed thrust-ring $f^7$, loosely surrounding the hub of the fly-wheel, the balls being held in a usual cage $f^{6\times}$. The ring $f^7$ is provided with the rearwardly-extended rods $f^{7a}$, springs $f^8$ being interposed between the adjusting-nuts $f^9$ on the ends of the said rods and the outer face of the movable clutch member $f^2$ and serving to press the latter normally into firm frictional contact or engagement with the fly-wheel $e^3$, which constitutes the fixed member of the clutch. The balls $f^6$ receive the thrust due to the action of the said springs $f^8$ and communicate the same from the ring-like member $f^7$ to the thrust bearing-plate $f^4$ and to the crank-shaft, thus offsetting and counterbalancing the pressure in an opposite direction of the springs through the movable clutch member upon the wheel $e^3$, also upon the crank-shaft; but as both the wheel and the disk $f^2$ rotate in unison while the clutch is engaged the balls remain stationary. Consequently while the frictional engagement of the movable clutch member with the fixed clutch member or wheel may be increased through the springs to any desired extent no end thrust is thrown thereby upon the crank-shaft of the engine. When, however, the movable clutch member $f^2$ is withdrawn, the balls $f^6$ will then revolve, while receiving the thrust, as before. At its opposite end the movable clutch-member sleeve $f^3$ is provided with a circumferentially-grooved flange $f^{10}$ for engagement by the yoke $f^{11}$, (see Fig. 4$^a$,) pivotally mounted in the yoke-like rocker $f^{12}$, mounted on trunnions $f^{13}$, journaled in the gear-case F. One of these trunnions is provided with an arm $f^{14}$, connected by a rod $f^{15}$ with a foot-lever $f^{16}$, arranged in convenient position for the operator of the vehicle, whereby the said sleeve $f^3$ and its attached movable clutch member may be moved in a direction to release the clutch and moved in an opposite direction by the springs to apply the clutch.

Referring again to Fig. 5 and also Fig. 3, the movable clutch-sleeve $f^3$ at its end adjacent the grooved flange $f^{10}$ is provided with a squared or other non-circular bore to receive the squared or other non-cylindrical end $f^{17}$ of the hub $f^{18}$ of the driving-gear $f^{19}$ of the transmission mechanism. The hub $f^{18}$ of this gear is cylindrical and is mounted in a suitable bearing $f^{20}$ (see Fig. 3) in the gear-case F. Thus the movable clutch member and its sleeve may be reciprocated axially relative to the driving-gear $f^{19}$ without losing driving connection therewith, which is always maintained by engagement of the non-cylindrical end of the gear-hub with the non-circular bore of the said clutch-sleeve. The driving-gear $f^{19}$ contains an internal bearing for the cylindrical end $g$ of the squared or other non-cylindrical transmission-shaft $g'$, (see Fig. 3,) provided at its opposite end also with a suitable cylindrical portion $g^2$, which runs in a suitable bearing $g^3$, formed within the gear-case. At its said opposite end and beyond said bearing $g^3$ said shaft $g'$ is fitted with a bevel-gear $g^4$, in mesh with and driving the mating gear $g^5$ upon the jack-shaft $f$ referred to and extending transversely of the vehicle and mounted in suitable bearings thereon, here shown as formed in or carried by the gear-case F. This jack-shaft may be of suitable or desired construction, the same being preferably divided in usual manner and provided with a compensating device $g^6$, to which the bevel-gear $g^5$ is attached, so as to permit its ends to turn at different rates of speed as may be necessary to permit the vehicle to be driven in other than a straight line. As here shown, the jack-shaft $f$ is provided at its opposite ends with heads $g^7$, diametrically grooved to receive correspondingly shaped and arranged projections $g^8$ on opposed heads which are fast on shaft-sections $g^9$, journaled in suitable bearings $g^{10}$ on the frame. These end shaft-sections $g^9$ are provided with usual sprocket-wheels $g^{10\times}$, about which are passed the sprocket-chains $f'$, leading rearwardly to the driving-wheels, whereby rotation of the said jack-shaft communicates driving motion to the said wheels. By providing detached end sections to the jack-shaft and connecting the same with the shaft proper by means such as the opposed heads provided with interlocking grooves and projections, as described, I provide a form of universal connection, which permits the jack-shaft to adjust itself to the wind or movements of the frame carrying the same and which it is desirable to provide for to prevent heating or undue wear in the bearings.

Referring to Fig. 3, the driving-gear $f^{19}$ is in constant mesh with and drives a gear 2, fast on the counter-shaft $g^{11}$, arranged parallel with the transmission-shaft $g'$ and mounted in suitable bearings, as $g^{12}$, in the gear-case. The gear-wheel 2 is here shown as formed upon a sleeve $g^{13}$, which also carries a gear 3, smaller, however, in diameter than the said gear 2. The counter-shaft $g^{11}$ near its opposite end has fast upon it other gears 4 and 5, the latter gear meshing with a reversing-pinion 6, (see Fig. 11,) mounted upon a shaft 7, rotating loosely in bearings in the gear-case. The transmission-shaft $g'$, Fig. 3, has mounted upon it a sliding transmission device or sleeve $g^{14}$, carrying at one end the gear 8 and at its opposite end the gear 9, said sleeve between said gears being circumferentially grooved to receive the operating-yoke $g^{15}$, Fig. 4$^b$, which (see Fig. 4) is connected at its upper end by a rod $g^{16}$ with an arm $g^{17}$ of a cross-shaft $g^{18}$, provided with a second arm $g^{19}$, to which is attached a rod $g^{20}$, leading forward to the shifting lever $g^{21}$, having a forward-and-back movement relative to the locking-segment $g^{22}$, the said lever being provided with usual locking devices $g^{23}$, cooperating with said segment to lock the said lever in desired position.

In the position of the parts shown in Fig. 3 rotation of the driving-gear $f^{19}$ in the direction of the arrow 25 thereon operates through the gear 2, shaft $g^{11}$, gear 4 thereon, and the gear 8 on the sleeve $g^{14}$ to rotate the transmission-shaft $g'$ in the same direction, also indicated by arrow 25, thence through the bevel-gears $g^4$ $g^5$ rotating the jack-shaft in the direction of the arrow 25 to propel the vehicle in a forward direction, and as the gear-wheel 2 is shown as twice the diameter of the driving-gear $f^{19}$ and as the gear 8 is twice the diameter of the gear 4 the rotation of the shaft $g'$, while in the same direction as that of the driving-gear $f^{19}$, will, however, be at one-fourth of the speed only.

Referring now to Fig. 7, if the transmission-sleeve $g^{14}$ be moved to the right to cause its gear 8 to engage the pinion 6 (see also Fig. 11) rotation of the driving-gear $f^{19}$ in the direction of the arrow 25, as before, will now operate through the gear 2, shaft $g^{11}$, gear 5 thereon, pinion 6, and gear 8 to rotate the said transmission-shaft in a reverse direction to propel the vehicle in a reverse or backward direction, and as the gear 2 is twice the diameter of the driving-gear $f^{19}$ and the pinion 6 less than half the diameter of the gear 8 such reverse motion will be less, herein one-sixth of the speed of the driving-gear. Starting now from the position of Fig. 7, if the transmission-sleeve $g^{14}$ be moved forward or to the left into its position Fig. 8, with the gear 8 between the gears 5 and 4, but engaging neither, no rotative motion whatsoever will be transmitted from the driving-gear $f^{19}$ to the shaft $g'$. Consequently with the transmission-sleeve in the position Fig. 8 the engine may run continuously without operating or propelling the vehicle, and with the said transmission-sleeve in the position Fig. 8 slight movement thereof rearwardly will throw into action the reverse driving mechanism, and correspondingly slight forward movement to the left, Fig. 8, into the position Fig. 3 will throw into gear the forward but low-speed driving mechanism. If now the transmission-sleeve $g^{14}$ be moved from its position Fig. 3 farther forward into its position Fig. 9, its gear 9 will be brought into mesh with the gear 3 on the shaft $g^{11}$, said gears 9 and 3, as here shown, being of the same diameter. Consequently rotation of the driving-gear $f^{19}$, as before, will operate through the gear 2, shaft $g^{11}$, and gears 3 and 9 to rotate the shaft $g^{11}$ in the same direction as the driving-gear, but at half the speed thereof, because the speed is reduced one-half between the driving-gear $f^{19}$ and the gear 2, but is transmitted from the gear 2 without further reduction through the gears 3 and 9 to the said shaft $g^{11}$, thus furnishing a speed most suitable, for instance, for average touring purposes.

It will be noticed that the driving-gear $f^{19}$ is considerably wider at its face than the meshing gear 2, and, referring to Figs. 10 and 12, the gear 9 is shown provided with a series of internal or clutch teeth 10, adapted to be slid into clutch engagement with the teeth of the driving-gear $f^{19}$, thereby to clutch or lock the said driving-gear to the said gear 9. Thus by moving the transmission-sleeve $g^{14}$ from its position Fig. 9 farther along into its position Fig. 10, with the internal gear 10 in locking engagement with the prolonged teeth of the driving-gear, the transmission-shaft $g'$ becomes, in effect, locked directly to the driving-gear $f^{19}$ and will therefore be rotated in unison therewith, furnishing the highest speed of which the mechanism is capable, and this highest speed is obtained without the interposition of any gears, and consequently transmits this highest speed without the loss of power and without the noise which would attend transmission of high speeds through trains of gearing. When transmitting this highest speed, the gear 2 and its attached counter-shaft $g^{11}$ and connected gears rotate idly, but at half the speed of the driving-gear. Such idle rotation thereof consumes little or no power and obviously produces no noise.

In practice the gear-case F is partially filled with a suitable lubricant, causing thorough lubrication of all the parts, both rotating and sliding, and insuring permanence and ease of operation of the various parts.

By arranging the squared transmission-shaft $g'$ in axial alinement with the driving-gear or driving-shaft, which permits the two shafts to be coupled or locked one directly to the other to be rotated as one shaft for the highest speed, I am enabled to dispense with a gear or pair of gears such as are ordinarily required in mechanisms of this sort for the transmission of highest speed.

Referring now to Fig. 4, the yoke $g^{15}$, which moves the sliding transmission-sleeve $g^{14}$, is provided above the gear-case with a fore-and-aft extended guiding-rod $g^{25}$, which slides in suitable bearings $g^{26}$, mounted on the gear-case. This guide-rod is notched at various points, as indicated at $g^{27}$, for engagement by the pivoted locking device or latch $g^{28}$, connected by a link $g^{29}$ with an arm $g^{30}$ of the rocking yoke $f^{12}$, (see Fig. 4ª,) which actuates the movable clutch member. When the movable clutch member is in its normal position, with the clutch thrown in to operate the driving-gear $f^{19}$, the pivoted locking device or latch $g^{28}$ drops into one or another of the notches of the guide-rod $g^{25}$, according to the position of the latter, and locks the transmission-sleeve against movement in either direction, thus effectually preventing shifting of the transmission mechanism while the clutch is in. Consequently the operator is compelled first to release the clutch in order to move the transmission-sleeve, and having moved such sleeve to obtain the desired speed and direction of gears throwing in of the clutch to operate the vehicle through the sleeve in its new position automatically locks the sleeve in such new position. Thus it is impossible to change the transmission without first releasing the clutch, and, conversely, it is impossible to again throw in the clutch without at the same time locking the transmission mechanism in its new position, both these features being desirable to prevent possible injury to the transmission mechanism caused by any accidental or intentional shifting of any of its parts while the mechanism is being used to transmit power from the clutch to the driving-wheels.

A brake-wheel $g^{31}$ is mounted upon the jack-shaft, to which may be applied any usual brake band or device through which the ordinary movements of the vehicle may be controlled, but which may be supplemented by other braking devices—as, for instance, upon the hubs of the driving-wheels—it being deemed unnecessary to show such devices more in detail.

It will be noticed that all shifting or sliding working parts, including the sliding parts of the clutch, are inclosed in the gear-case and maintained thereby thoroughly lubricated.

My invention is not limited to the particular embodiment thereof herein shown and described, but may be varied within the spirit and scope of my invention.

I claim—

1. In a transmission-gear for automobiles, the combination of a driving member, a driven member, a driving-gear for the former, a plurality of intermediate gears, including a reversing-gear, and means, including a single shiftable element only, for driving said driven member through any one of said intermediate gears.

2. In a transmission-gear for automobiles, the combination of a driving member, a driven member, a driving-gear for the former, a plurality of intermediate gears, including a reversing-gear, and means, including a single shiftable element only, for coupling said driving member to said driven member and for also driving said driven member through any one of said intermediate gears.

3. In a transmission mechanism for motor-vehicles, a driving member, a driven member axially alined therewith, a non-shiftable gear secured to one of said members, a counter-shaft, an intermediate gear upon said counter-shaft in engagement with said non-shiftable gear, other gears upon said counter-shaft, a reversing-gear in fixed engagement with one of said other gears, an axially-shifting gearing element secured to the member other than that to which said non-shiftable gear is secured, and means for shifting said gearing element into engagement with said reversing-gear or with other gears upon said counter-shaft, and for also coupling the same to said non-shiftable gear.

4. In a transmission mechanism for motor-vehicles, a driving member, a driven member axially alined therewith, a non-shiftable gear secured to one of said members, a counter-shaft, a gear upon said counter-shaft in engagement with said non-shiftable gear, a gear at the opposite end of said counter-shaft, a reversing-gear engaging with said last-named gear, a pair of intermediate gears of different diameter also on said counter-shaft, an axially-shifting element secured to the member other than that to which said non-shiftable gear is secured and carrying two gears of different diameters, and means to shift said element into engagement with said reversing-gear or with said intermediate gears and for also coupling the same to said non-shiftable gear.

5. Transmission mechanism for motor-vehicles, the same comprising a driving member, a driven member, means to couple said driven member to said driving member to be driven by the latter and means comprising a single shiftable element only to drive said driven member at a different speed from said driving member and to drive said driven member in reverse direction from said driving member.

6. Transmission mechanism for motor-vehicles, the same comprising a driving member, a driven shaft axially alined therewith, means to couple said member and shaft one to the other for direct drive of the latter by the former, a plurality of gears arranged at one side the axis of said shaft and driven by said driving member, and a shiftable transmission device on said shaft and adapted to engage the said plurality of gears to drive said shaft at different speeds, and in the same, also in a reverse direction.

7. Transmission mechanism for motor-vehicles, the same comprising a driving member, a driven member axially alined therewith, a plurality of gears arranged at one side of axis of said driving member and driven by said driving member, an externally-toothed transmission-gear; a second externally-toothed transmission-gear, having also internal teeth to engage the external teeth of said first gear, both said gears being in axial alinement with said driving member, one being secured to said driving member and the other to said driven member, and one of said gears being axially shiftable to separately engage the said plurality of gears and also said other gear.

8. Transmission mechanism for motor-vehicles, the same comprising a driving member, a driven shaft, a plurality of transmission-gears mounted to slide thereon, and a plurality of intermediate gears arranged at one side said shaft to engage respectively, but singly the said transmission-gears and to drive the same, said intermediate gears being driven by said driving member, and means to couple said driven shaft directly to said driving member.

9. Transmission mechanism for motor-vehicles, the same comprising a driving member, a driven shaft, a plurality of transmission-gears mounted to slide thereon, and a plurality of intermediate gears arranged at one side said shaft to engage respectively, but singly the said transmission-gears, said intermediate gears being driven by said driving member, and means to couple said driven shaft directly to said driving member through the medium of a transmission-gear.

10. Transmission mechanism for motor-vehicles, the same comprising a driving-gear, a driving-clutch and its movable member connected with and to rotate said driving-gear, a driven shaft alined axially with said driving-gear, one or more transmission-gears mounted to slide on said driven shaft, a counter-shaft, parallel with said driven shaft, and gears thereon driven by said driving-gear and for engagement respectively with the said transmission gear or gears, and a reversing-gear also driven from said counter-shaft and for engagement with a transmission-gear.

11. The combination with the motor and its balance-wheel constituting one clutch member, a coöperating movable clutch member, and springs to press the latter normally into frictional engagement with said wheel, a driving-gear connected to rotate with said movable clutch member, upon and relative to which said movable clutch member has axial movement, a driven shaft and means to drive it at the same and also at different speeds from said gear.

12. The combination of the motor, the fixed and movable clutch members therefor, the driving-gear connected with one of said clutch members to rotate therewith and to permit relative axial movement thereof, a driven shaft axially alined with said driving-gear, means to couple the said gear and driven shaft to cause the two to rotate in unison, and means also to drive said shaft from said gear, at a different speed.

13. In a motor-vehicle, the motor, clutch, driving-gear and driven shaft all axially alined, means to drive said driven shaft from said driving-gear at the same and also at different speeds, a jack-shaft arranged at an angle with said driven shaft and driven therefrom, and vehicle driving-wheels connected with and driven from said jack-shaft.

14. Transmission mechanism for motor-vehicles comprising a driving-gear, a non-circular driven shaft, a transmission-sleeve mounted to slide thereon and provided with a plurality of gears of different diameters, one of said gears being also internally toothed to engage said driving-gear for direct driving of said shaft by said gear, a counter-shaft arranged parallel with said driven shaft and provided with a plurality of direct driving-gears of different diameters for engagement respectively with the gears of said sliding transmission-sleeve, and a reversing-gear, also connected with said counter-shaft and for engagement with one of the gears of said sleeve to rotate said driven shaft in a reverse direction.

15. In a motor-vehicle a motor, its clutch and operating means therefor, transmission mechanism to transmit the motive power at the motor speed or at one or more speeds at variance therewith, operating means therefor, movable independently of said clutch-operating means, and means connecting said clutch-operating means and transmission-operating means for enforcing release of the clutch before change of transmission.

16. In a motor-vehicle a motor, its clutch and operating means therefor, transmission mechanism to transmit the motive power at the motor speed or at one or more speeds at variance therewith, operating means therefor, movable independently of said clutch-operating means, and means for enforcing predetermined position of the transmission-operating means before throwing in of the clutch.

17. The combination with a motor, a clutch through which the motive power is transmitted, and clutch-operating means, of transmission mechanism including a sliding transmission device and locking means to lock the same in its various positions said locking means being movable independently of said clutch-operating means and connected with and to be controlled by the clutch-operating means.

18. In a transmission-gear for automobiles the combination of a driving member, a driven member, and means comprising a single shiftable element only for coupling said driving member to said driven member to drive the latter from the former and for varying the speed and direction of movement transmitted from said driving member to said driven member.

19. Transmission mechanism for automobiles, the same comprising a driving-gear, a driven shaft and means to rotate the same at varying speeds from said driving-gear, a shiftable transmission member for effecting the various changes in speed, and a reversing-gear continuously operated from said driving-gear and adapted for engagement by said shiftable member.

20. Transmission mechanism for automobiles, the same comprising a driving-shaft, a counter-shaft driven therefrom, a plurality of fixed intermediate gears, including a reversing-gear, driven by said counter-shaft, a driven shaft and means comprising a shiftable transmission device to rotate the latter from the driving-shaft to any one of said intermediate gears.

21. Transmission mechanism for automobiles, the same comprising a driving-shaft, a counter-shaft driven therefrom at a reduced speed, a plurality of fixed intermediate gears, including a reversing-gear driven by said counter-shaft, a driven shaft and means comprising a shiftable transmission device to rotate the latter from the driving-shaft through any one of said intermediate gears.

22. Transmission mechanism for motor-vehicles, the same comprising a driving-gear, a counter-shaft continuously rotated at reduced speed thereby, a driven shaft, means to transmit motion at varying speeds from said counter-shaft to said driven shaft, and a reversing-gear also continuously driven from said counter-shaft.

23. Transmission mechanism for motor-vehicles comprising a driving member, a shiftable transmission member, means to couple said transmission member to said driving member, one or more stationary intermediate gears driven by said driving member and means to bring said transmission member into separate engagement and disengagement with said one or more intermediate gears.

24. Transmission mechanism comprising a driving member and a driven member adapted to be driven one by the other at the same speed, at different speeds or in a reverse direction and mechanism including a single shiftable element only for obtaining such changes in speed and direction.

25. Transmission mechanism for motor-vehicles comprising a driving member, a driven shaft axially alined therewith, a shiftable transmission device on said shaft, means for coupling said driving member and said driven device, one to the other for the direct drive of the latter by the former, one or more stationary gears arranged at one side the axis of said shaft and driven by said driving member, and means to shift said transmission device into engagement with the said one or more gears to drive said shaft at varying speeds.

26. In a motor-vehicle, a motor, clutch driving-gear and driven shaft all axially alined, intermediate gears between said driven shaft and said driving-gear, a single shiftable element to couple said driven shaft to said driving-gear and to drive said shaft from said driving-gear through any one of said intermediate gears, a jack-shaft arranged at an angle with said driven shaft and driven therefrom, and vehicle driving-wheels connected with and driven from said jack-shaft.

27. Transmission mechanism for motor-vehicles, the same comprising a driving member, an independently-rotatable driven shaft, a plurality of transmission-gears mounted to slide thereon, and a plurality of intermediate gears arranged at one side said shaft to engage respectively, but singly the said transmission-gears, said intermediate gears being driven by said driving member, and means to couple said driven shaft directly to said driving member.

28. The combination with the motor and its balance-wheel constituting one clutch member, a coöperating movable clutch member, and springs to press the latter normally into frictional engagement with said wheel, a driving-gear connected to rotate with said movable clutch member, upon and relative to which said movable clutch member has axial movement, and a driven shaft driven by said driving-gear.

29. In a motor-vehicle transmitting mechanism provided with a slidable transmission member having three or more operative positions for providing varying speeds, operating means therefor, a clutch interposed between said motor and said transmission mechanism, clutch-operating means therefor, and means connecting said clutch-operating means and said transmission-operating means for enforcing release of the clutch when said slidable member passes from one position to another.

30. In a motor-vehicle, a motor, clutch, driving-shaft and driven shaft all axially alined, means comprising a single shiftable element only for varying the speed and direction of movement transmitted from said driving-shaft to said driven shaft, a jack-shaft arranged at an angle with said driven shaft and driven therefrom, and vehicle driving-wheels connected with and driven from said jack-shaft.

31. In a transmission mechanism for motor-vehicles, a driving member, a driven member, axially alined therewith, a non-shiftable gear secured to one of said members, a counter-shaft, an intermediate gear upon said counter-shaft in engagement with said non-shiftable gear, other gears upon said counter-shaft, a reversing-gear in fixed engagement with one of said other gears, an axially-shiftable element secured to the member other than that to which said non-shiftable gear is secured, and means for shifting said element to drive said driven member from said driving member directly or through said reversing-gear or other gear upon said counter-shaft.

32. In a transmission mechanism for motor-vehicles, a driving member, a driven member axially alined therewith, a non-shiftable gear secured to one of said members, a counter-shaft, a gear secured to said counter-shaft in engagement with said non-shiftable gear, a gear at the opposite end of said counter-shaft, a fixed reversing-gear driven thereby, an intermediate gear on said counter-shaft, a shiftable gearing element secured to the member other than that to which said non-shiftable gear is secured, and means for shifting said gearing element into engagement with said intermediate gear or to directly couple said driving and driven members or to drive said driven member through said reversing-gear.

33. In a transmission mechanism for motor-vehicles, a driving member, a driven member axially alined therewith, a non-shiftable gear secured to said driving member, a counter-shaft, a gear on said counter-shaft engaging with said non-shiftable gear, a gear at the opposite end of said counter-shaft, a reversing-gear in fixed engagement therewith, an intermediate gear secured to and driven by said counter-shaft, a shiftable gearing element on said driven member, but rotatable therewith, and means for shifting said gearing element into engagement with said reversing-gear or said intermediate gear or coupling the same directly to said non-shiftable gear.

34. In a transmission mechanism for motor-vehicles, a driving member, a driven member axially alined therewith, a non-shiftable gear secured to said driving member, a counter-shaft, a gear secured on said counter-shaft in engagement with said non-shiftable gear, a plurality of other gears on said counter-shaft secured to and driven by the same, a shiftable gearing element on said driven member, but rotatable therewith, and means for shifting said element into engagement with said other counter-shaft gears or for coupling the same directly to said non-shiftable gear.

35. In a transmission-gear for automobiles, the combination of a driving member, a driven member axially alined therewith, and means comprising a single shiftable element only to couple said driving and driven members together and to vary the speed and direction of movements transmitted from said driving member to said driven member.

36. In a transmission-gear for automobiles, the combination of a driving-shaft, a counter-shaft constantly driven therefrom at a reduced speed, a driven shaft, a plurality of fixed intermediate gears driven by said counter-shaft, and a shiftable transmission device to rotate the driven shaft from the counter-shaft through any one of said intermediate gears.

37. In a transmission-gear for automobiles the combination of a driving-shaft, a driven shaft in axial alinement therewith, a counter-shaft constantly driven by said driving-shaft at a reduced speed, a plurality of fixed intermediate gears driven by said counter-shaft, and means comprising a shiftable transmission device to rotate the driven shaft from the counter-shaft through any one of said intermediate gears and to drive said driven shaft directly from said driving-shaft.

In testimony whereof I have signed my name to this specification in the presence of two subscribing witnesses.

ANDREW L. RIKER.

Witnesses:
FREDERICK L. EMERY,
ALBERT C. SCHULZ.